United States Patent [19]

Sekmakas et al.

[11] 4,387,197
[45] Jun. 7, 1983

[54] PRODUCTION OF WATER SOLUBLE AMINE RESINS

[75] Inventors: Kazys Sekmakas, Palatine; Raj Shah, Schaumburg, both of Ill.

[73] Assignee: DeSoto, Inc., Des Plaines, Ill.

[21] Appl. No.: 355,381

[22] Filed: Mar. 8, 1982

[51] Int. Cl.³ .................. C08G 59/62; C08G 59/28; C08G 59/14

[52] U.S. Cl. .................. 525/481; 204/181 C; 523/414; 525/490; 528/99; 528/103; 528/104; 528/107

[58] Field of Search ............ 204/181 C; 523/414; 528/99, 107, 104; 525/481, 490

[56] References Cited

U.S. PATENT DOCUMENTS

| | | | |
|---|---|---|---|
| 4,001,155 | 1/1977 | Kempter et al. | 525/490 X |
| 4,134,932 | 1/1979 | Kempter et al. | 525/481 |
| 4,188,312 | 2/1980 | Blum et al. | 525/109 |
| 4,189,450 | 2/1980 | Kempter et al. | 525/455 |
| 4,260,697 | 4/1981 | Gulbins et al. | 525/484 |
| 4,269,742 | 5/1981 | Goeke et al. | 528/99 X |
| 4,312,799 | 1/1982 | Sekmakas et al. | 528/107 X |

*Primary Examiner*—Earl A. Nielsen
*Attorney, Agent, or Firm*—Dressler, Goldsmith, Shore, Sutker & Milnamow, Ltd.

[57] ABSTRACT

The production of amine resins having Mannich base groups which dissolve in water with the aid of a solubilizing acid is disclosed in which a dihydric phenolic organic compound, such as a bisphenol, is reacted in organic solvent medium with at least 3 moles of formaldehyde per mol of bisphenol to at least partially methylolate the bisphenol prior to other reactions. The at least partially methylolated product is then reacted with a stoichiometric deficiency of organic diepoxide, and then with monosecondary amine to provide Mannich base groups. The Mannich base-containing product is then reacted with additional epoxide-functional material.

17 Claims, No Drawings

PRODUCTION OF WATER SOLUBLE AMINE RESINS

TECHNICAL FIELD

This invention related to the production of water soluble amine resins which are Mannich bases. They are particularly useful in cathodic electrocoating.

BACKGROUND ART

We have previously produced water soluble amine resins which are Mannich bases by reacting a dihydric phenolic organic compound, preferably a bisphenol, with a stoichiometric deficiency of a diepoxide, and then reacting the product so-obtained, with formaldehyde and secondary amine to provide Mannich base groups. The product with its Mannich base groups was then reacted with epoxide-functional material, preferably a diepoxide, to provide a resinous product which is solubilized in water with the aid of a solubilizing acid.

These materials, and their production, are the subject of our prior application Ser. No. 282,512 filed July 13, 1981. As taught in said prior application, large amounts of formaldehyde and epoxy-functional materials can be used to provide a product having excellent stability, even when so little solubilizing acid is used as provides an alkaline pH in the aqueous solutions which are obtained.

It is desired to maximize the proportion of formaldehyde which is reacted and to distribute the methylol groups formed by this reaction as uniformly as possible. In this way, it is hoped that water solubility will be maximized to decrease the risk of encountering any instability as would cause particle formation or settling in an electrocoating tank.

Also, the reaction sequence set forth in Ser. No. 282,512 leads to complex chemistry, and it is desired to simplify this chemistry.

DISCLOSURE OF INVENTION

In accordance with this invention, the dihydric phenolic organic compound is first reacted in solvent medium with formaldehyde. This is desirably carried out using a lower alcohol, such as isopropanol, as the solvent, and a trace of an amine catalyst to aid the methylolaton reaction. The formaldehyde is desirably added as paraformaldehyde and the mixture is heated to cause at least partial solubilization of the paraformaldehyde which is a solid flake material. This indicates the occurrence of substantial methylolation, and as will be evident, one can expect that this methylolation will proceed uniformly for there is nothing to confine the reaction to only some of the phenolic moieties which are present.

The methylolated dihydric phenolic compound is then reacted with a stoichiometric deficiency of organic diepoxide. Since some of the formaldehyde may not have reacted to this point, the formaldehyde reaction may continue while the diepoxide is reacting and after it has been reacted. As a result of prereaction, the polymeric product may have methylol groups on interior aromatic rings, and it was not possible to achieve this in the procedure described in Ser. No. 282,512.

Reaction is then had with monosecondary amine and with additional epoxide-functional material, as in said prior application, and this provides a resinous product which is soluble in water with the aid of a solubilizing acid.

The dihydric phenols are preferrably bisphenols which have the structure:

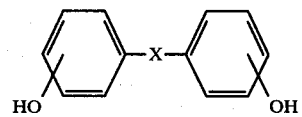

wherein X is a straight chain or branched chain divalent aliphatic radical of from 1 to 3 carbon atoms, or $>SO_2$, $>SO$, or $-O-$.

This known class of compounds is illustrated herein by the preferred bisphenol which is bisphenol A in which X is 2,2'-propylidene, and the two OH groups are in the para position. Other bisphenols which can be used are illustrated by 4,4'-thiodiphenol and 4,4'-sulfonyl diphenol. Dihydric phenolic organic compounds other than bisphenols are illustrated by resorcinol.

The diepoxides are preferably aromatic, especially diglycidyl ethers of a bisphenol having a molecular weight of about 350 to about 5000, preferably 350 to 600. Aliphatic diepoxides, such as glycerin diglycidyl ether, are also useful. Monoepoxides may be present so long as there is a 1,2-epoxy equivalency of at least about 1.4. From 0.3 to 0.6 equivalents of epoxide are used per equivalent of phenolic OH in the starting dihydric compound.

The reaction with formaldehyde is conventional and is illustrated in the examples. The reaction is normally carried out at a moderate temperature of about 80° C. and it is speeded by the presence of a trace (up to about 1% by weight) of an amine, as is known.

It is desired to use at least 3 moles of formaldehyde per mol of bisphenol, but we prefer to use more than about 3.5 moles of formaldehyde per mol of starting diphenolic organic compound.

The function of the large proportion of formaldehyde is not entirely understood, but excellent solubility in water at a 4 molar proportion ratio is reduced to very good solubility at 3.5 moles, and to marginal solubility at 3.0 moles. In this invention at least part of the reaction with formaldehyde should precede reaction with diepoxide.

Any monosecondary amine may be used, exactly as in the prior art. These have the formula $R-NH-R'$ where R and R' may be the same or different and are desirably $C_1-C_8$ alkyl and the corresponding alkanol. These are illustrated by di-N-butyl amine or di-N-ethyl amine. Diethanol amine will illustrate the hydroxy functional amines which are useful. The dialkyl amines and the hydroxy alkyl amines are desirably used in admixture. It is desirably, but not essential, to use a stoichiometric deficience of the amine component.

The reaction between the methylol derivative which is produced by reaction with formaldehyde and the monosecondary amine will be illustrated in the examples.

The resulting Mannich base is then reacted with additional diepoxide which need not be aromatic, but which is preferably of the same aromatic type used to form the initial bisphenol-diepoxide reaction product. From 0.5 to 2 epoxy equivalents are used per epoxy equivalent in the diepoxide initially used, preferably from 1 to 1.5 equivalents on the same basis.

The final product is then dispersed in water with the aid of a solubilizing acid. The solubilizing acids are well known and will be illustrated herein by acetic acid. The acid proportion is governed by the acidity of the final bath which may range from quite acid to slightly alkaline. The pH is preferably in the range of pH 5–9, most preferably 6–8.5.

The products of this invention may contain methylol groups and self cure, but it is preferred to add a curing agent to enhance the cure. Aminoplast resins and phenoplast resins are well known for this purpose and are useful herein in an amount of from 2% to about 35%, based on the weight of the Mannich base-epoxide reaction product. The selection of the curing agent which is optionally used is illustrated in the examples, but is not a feature of this invention. From 10% to 35% of aminoplast represents preferred practice.

Organic solvents are also used and the selection of these is not critical. Alcoholic solvents, such as butanol, are quite useful, but even ketone solvents, such as methyl ethyl ketone, which may react with the amine reactants to some extent, may be employed.

It is difficult in the complex chemistry at hand to know precisely how much formaldehyde has been reacted into the polymer, but it is believed that incorporation of reacted formaldehyde is increased and that the distribution is more uniform. This should improve the water solubility of the product with the aid of a solubilizing acid, and it should also enhance the self-curing properties.

EXAMPLE 1

680 grams of bisphenol A are mixed with 550 grams of isopropanol and 440 grams of paraformaldehyde at 35° C. After 30 minutes of mixing, the temperature was maintained for 3 hours. Some of the formaldehyde flakes dissolved during this period, but a substantial proportion of these flakes remained undissolved in the agitated reaction flask. About 6.15 moles of formaldehyde per mol of bisphenol were used.

543 grams of a catalyzed diglycidyl ether of bisphenol A having an epoxide equivalent weight of 180 (Epon 829 of Shell Chemical Company may be used) are dissolved in 290 grams of 2-butoxy ethanol and this solution is added slowly to the flask of partially methylolated bisphenol A over a period of 1½ hours at 75° C. This temperature was then maintained for 4 hours. At the end of this period all of the paraformaldehyde had dissolved and the mixture is cooled.

440 grams of di-butyl amine and 500 grams of diethanolamine are dissolved in 200 grams of isopropanol and this solution is slowly added to the reaction mixture in the flask after that mixture had been reheated to 80° C. and held for 1 hour. This addition was carried out over a ½ hour period and the mixture is maintained at 80° C. for 3 hours. In this way, Mannich base groups are provided.

600 grams of the same digylcidyl ether used previously are dissolved in 120 grams of methyl ethyl ketone and this solution is added to the reaction mixture produced above and the mixture is maintained at 70° C. for 4 hours and the finished product is then cooled to provide a solution having a resin solids content of 66.6% and a Gardner viscosity of $Z_5^+$.

EXAMPLE 2

100 grams of the 66.6% solids solution produced in Example 1 are mixed with 14 grams of methylated-ethylated benzoguanamime-formaldehyde condensate (American Cyanamid product XM 1123) and 6 grams of acetic acid. 680 grams of deionized water are then added slowly with rapid agitation to disperse the polymer and the cross-linker in the aqueous medium. The pH of the resulting solution is 6.4.

Zinc phosphate treated steel panels were coated with the cationic polymer solution of this Example using a unidirectional electrical current to deposit the resins on the panels as cathode. The following results are obtained.

Using 75 volts for electrodeposition, a film 0.3 mil in thickness is obtained. At 100 volts, the film is 0.55 mil and at 150 volts the film has a thickness of 0.75 mil. These coated steel panels are rinsed after electrodeposition with deionized water and baked at 375° F. for 20 minutes. The baked coatings pass 100 double rubs with a methyl ethyl ketone-saturated cloth and have excellent flexibility as indicated by passing a 60 inch/pound reverse impact test. The cured films are very hard (4H pencil hardness).

EXAMPLE 3

545 grams of bisphenol A are mixed at 35° C. with 440 grams of isopropanol, 352 grams of paraformaldehyde and 20 grams of dibutylamine catalyst for methylolation reaction. The material is heated to 80° C. which is maintained for 3 hours to provide partial methylolation.

435 grams of the same diglycidyl ether of bisphenol A used in example 1 are dissolved in 232 grams of 2-butoxy ethanol. This solution is added to the partially methylolated product produced above over a 1½ hour period at 80° C. and the material is heated for 4 hours at this temperature.

352 grams of di-butyl amine and 400 grams of diethanolamine are dissolved in 160 grams of isopropanol and the solution is added to the product previously obtained over a ½ hour period. Thereafter, a temperature of 80° C. is maintained for 3 hours.

480 grams of the same diglycidyl ether of bisphenol A used previously are dissolved in 96 grams of methyl ethyl ketone and this solution is added to the reaction mixture at 70° C. and this temperature is maintained for 4 hours. The product is cooled to provide a solution having a solids content of 64.4% and a Gardner viscosity of $Z_5$–$Z_6$.

EXAMPLE 4

Using the Example 3 solution in the Example 2 system provides essentially the same results.

What is claimed is:

1. A method for the production of amine resins having Mannich base groups which dissolve in water with the aid of a solubilizing acid comprising, reacting a dihydric phenolic organic compound in organic solvent medium with formaldehyde in an amount of at least 3 moles per mol of dihydric phenolic compound to at least partially methylolate said dihydric phenolic compound, reacting the at least partially methylolated product with a stoichiometric deficiency of organic diepoxide, then reacting the product so-provided wth monosecondary amine to provide Mannich base groups, and then reacting the product with its Mannich base groups with additional epoxide-functional material.

2. A method as recited in claim 1 in which said dihydric phenolic compound is a bisphenol.

3. A method as recited in claim 2 in which said bisphenol is bisphenol A.

4. A method as recited in claim 1 in which said organic medium is alcoholic.

5. A method as recited in claim 4 in which said alcoholic solvent comprises isopropanol.

6. A method as recited in claim 5 in which said isopropanol is used in admixture with 2-butoxy ethanol.

7. A method as recited in claim 1 in which said formaldehyde is used in the form of paraformaldehyde.

8. A method as recited in claim 1 in which said formaldehyde is used in an amount of at least about 3.5 moles of formaldehyde per mol of dihydric phenolic compound.

9. A method as recited in claim 1 in which a trace of an amine catalyst is used to aid the methylolation reaction.

10. A method as recited in claim 1 in which said organic diepoxide is a diglycidyl ether of a bisphenol having a molecular weight of about 350 to about 5000.

11. A method as recited in claim 10 in which the molecular weight is from about 350 to about 600.

12. A method as recited in claim 1 in which the equivalent ratio of dihydric organic compound to diepoxide is from 0.3 to 0.6 equivalents of epoxide per equivalent of phenolic OH in said dihydric organic compound.

13. A method as recited in claim 1 in which said monosecondary amine is a mixture of dialkyl amine and di-hydroxyalkyl amine.

14. A method as recited in claim 13 in which a mixture of di-N-butylamine and diethanol amine is used to provide the said mixture of amines.

15. A method for the production of amine resins having Mannich base groups which dissolve in water with the aid of a solubilizing acid comprising, reacting a bisphenol in alcoholic solvent medium with formaldehyde in an amount of at least about 3.5 moles of formaldehyde per mol of bisphenol to at least partially methylolate said bisphenol, reacting the at least partially methylolated product with from 0.3 to 0.6 equivalents of a diglycidyl ether of a bisphenol per equivalent of phenolic OH in said bisphenol, then reacting the product so-provided with monosecondary amine to provide Mannich base groups, and then reacting the product with its Mannich base groups with additional diglycidyl ether of a bisphenol.

16. The product of the method of claim 1.

17. The product of the method of claim 15.

* * * * *